United States Patent
Gossmann

(10) Patent No.: US 9,722,714 B1
(45) Date of Patent: Aug. 1, 2017

(54) FREQUENCY DIFFERENCE DETERMINATION

(71) Applicant: Intel IP Corporation, Santa Clara, CA (US)

(72) Inventor: Timo Gossmann, Neubiberg (DE)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 15/295,073

(22) Filed: Oct. 17, 2016

(51) Int. Cl.
*H04B 17/21* (2015.01)
*H04L 1/24* (2006.01)

(52) U.S. Cl.
CPC .............. *H04B 17/21* (2015.01); *H04L 1/24* (2013.01)

(58) Field of Classification Search
CPC ........ H04B 17/20; H04B 17/21; H04B 17/29; H04L 1/24
USPC ................ 375/224, 226, 295, 316, 346, 354
See application file for complete search history.

(56) References Cited

U.S. PATENT DOCUMENTS

| | | | |
|---|---|---|---|
| 2002/0151292 A1* | 10/2002 | Sevens ...................... | H03J 3/08 455/313 |
| 2004/0070450 A1* | 4/2004 | Lindell ..................... | H03F 1/32 330/149 |
| 2012/0269245 A1* | 10/2012 | Mehrmanesh ..... | H04B 17/0085 375/224 |
| 2016/0077196 A1* | 3/2016 | Dehlink ............. | G01R 31/2822 342/169 |

* cited by examiner

*Primary Examiner* — Siu Lee
(74) *Attorney, Agent, or Firm* — Schiff Hardin LLP

(57) ABSTRACT

A receiver having a test signal generator configured to generate a test signal that free of a requirement to be frequency locked, and to measure a frequency of the test signal; and a local oscillator signal source configured to tune a local oscillator signal to a difference frequency with respect to the measured test signal frequency, wherein the difference frequency falls within a passband of a passband filter of the receiver.

25 Claims, 6 Drawing Sheets

FREQUENCY DIFFERENCE DETERMINATION

TECHNICAL FIELD

The present disclosure generally relates to a receiver configured to determine an In-Phase/Quadrature (I/Q) imbalance.

BACKGROUND

Wireless device impairments can be cancelled by post processing a received signal when deteriorating device parameters are sufficiently well known. Theoretically the parameters can be determined during production test on a sample-by-sample basis and stored within the device or elsewhere in the overall wireless system. Later, during device operation, this information can be used by an algorithm to correct the received, impaired signal. To determine Local Oscillator (LO) and receiver internal impairments, a common method is to inject a test signal into the signal receiving port during a production test and evaluate the obtained receiver output signals in a post processing step. However, this production test approach assumes stable impairments. Also, fusing and production calibration imposes additional effort and cost.

More suitable is an auto calibration procedure to be applied at every device start-up or during operation right before the receiver begins normal operation. The generation of a precise test signal supplied from the production tester is no longer available. This approach requires an on-board signal source, but such a source is supposed to be precise, which typically increases device cost or area significantly.

A quadrature modulator architecture's own transmitter output signal can be used as test signal because of the signal's composite modulation in contrast with the non-modulated LO signal. However, in polar transmitter architectures, the on-board approach is not possible because the same phase modulated LO is also used as LO for the feedback receiver. As a result, the received and down converted feedback signal has a constant relative phase and the demodulated signal maps only to a pure radial trajectory in the constellation diagram rather than a circular distributed trajectory. Maintaining the calibration approach but introducing a precise on-board signal source comparable to the one from the production tester is too costly because of the required fidelity and precise frequency control across a greater frequency range.

DESCRIPTION OF THE ASPECTS

The present disclosure is directed to a receiver having a test signal generator configured to generate a test signal that is free of a requirement to be frequency locked to a local oscillator (LO) signal, and to measure a frequency of the test signal, and a local oscillator signal source configured to tune a local oscillator signal to a difference frequency with respect to the measured test signal frequency, wherein the difference frequency falls within a passband of a passband filter of the receiver. This difference frequency may be used to determine an I/Q imbalance of the I/Q receiver.

I/O imbalances occur due to mismatches between the parallel sections of the receiver chain dealing with the in-phase (I) and quadrature (Q) signal paths. The local oscillator (LO) generates a sine/cosine wave or square wave, and a copy of the wave is delayed by 90 degrees. When the direct LO output is mixed with the original signal, this produces the I signal, whereas when the delayed LO output is mixed with the original signal, that produces the Q signal. In the analog domain, the delay is never exactly 90 degrees due to inevitable impairments, and thus has a phase offset. Similarly, analog gain is never perfectly matched for each of the signal paths, resulting in an amplitude offset.

Figure 1:
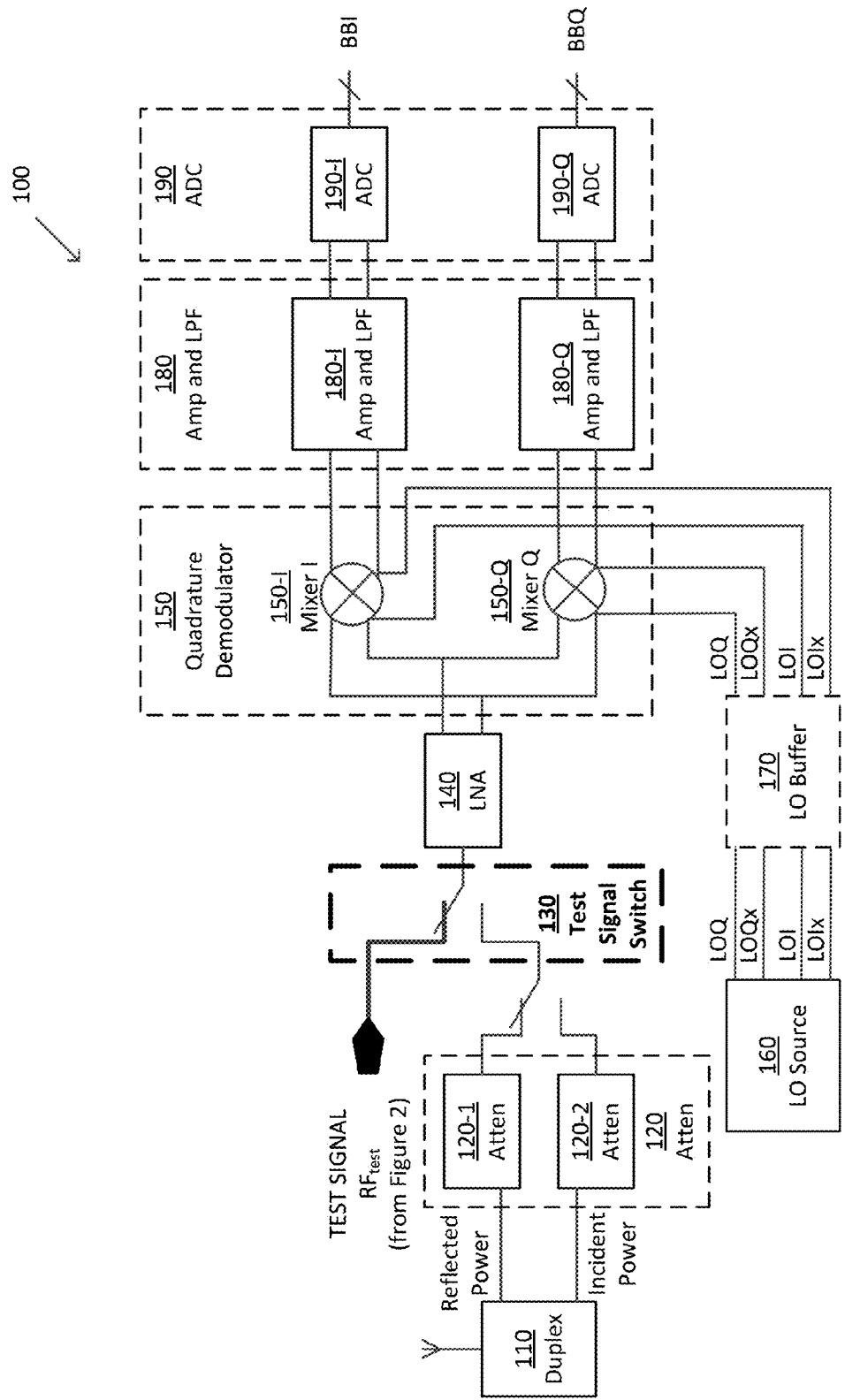
FIG. 1 illustrates a schematic diagram of a receiver in accordance with an aspect of the disclosure.

FIG. 1 illustrates a schematic diagram of a receiver 100 in accordance with an aspect of the disclosure.

The receiver 100 comprises a receiving port, a duplexer 110, attenuators 120, a test signal switch 130, a Low Noise Amplifier (LNA) 140, a quadrature demodulator 150, a Local Oscillator (LO) signal source 160, an optional local oscillator (LO) buffer 170, an amplifier and Low Pass Filter (LPF) 180, an Analog-to-Digital Converter (ADC) 190, and a memory (not shown).

The directional coupler 110, as is known, allows separate reception of incident and reflected signals. The directional coupler 110 is coupled with the attenuator 120, which comprises attenuator 120-1 and attenuator 120-2. Attenuator 120-1 is configured to reduce a power of the received reflected signal, and attenuator 120-2 is configured to reduce a power of the incident signal. The attenuator(s) 120-1 and/or 120-2 are required to avoid overdriving the connected LNA 140. If the received signal power is low enough to be handled from the LNA 140 directly, the attenuator(s) 120-1 and/or 120-2 are not required.

The LNA 140 is configured to amplify or buffer a low-power reflected signal, and output the amplified signal to the quadrature demodulator 150.

The quadrature demodulator 150 is configured to demodulate the reflected signal (during normal operation) or the test signal (during calibration) with the LO signal and output a baseband I/O output signal. Whether the quadrature demodulator 150 demodulates the reflected signal or the test signal depends on the position of the test signal switch 130. The quadrature demodulator 150 comprises two mixers configured to mix a LO signal with the amplified signal from LNA 140 using differential signaling, though a single-ended signal arrangement is also possible. Mixer I 150-1 is configured to mix in-phase portions of the signals, and mixer Q 150-0 is configured to mix quadrature portions of the signals, and these mixers 150 output sum and difference frequencies of I and Q signals.

The LO source 160 may be, for example, a frequency synthesizer, as is known. The LO source 160 is configured to generate a differential signal, which again, may alternatively be single ended in some applications. More specifically, signals LOQ and LOI have a 90 degree phase shift with respect to one another, and "x" represents the respective opposite phases. The optional LO buffer 170 is configured to buffer the LO signal. Alternatively, there may be no such buffer, or there could be a plurality of buffers in a chained configuration.

The amplifier and LPF 180 comprises an amplifier and LPF (Low Pass Filter) for each of the I and Q signal paths to suppress sum frequencies generated in the mixers 150. The LPFs are configured to attenuate the sum frequencies so that only the difference frequencies remain. The amplifiers are configured to amplify the difference frequencies. The ADC 190 comprises an ADC for each of the I and Q signal paths. The ADC 190 is configured to covert the signals on the I and Q signal paths from analog to digital processing signals.

Impairments may be caused by any of the quadrature demodulator 150, amplifier and LPF 180, and ADC 190 with these impairments contributing to a gain imbalance. In the incoming LO signal between LOI and LOQ, there can also be a phase imbalance between the I and Q signals such that these signal components are not 90 degrees apart. Also, the LOI/Q amplitude(s) may be different. The phase imbalance and amplitude changes are to be compensated.

The memory (not shown) is configured to store the outputs of ADC 190. The memory may be located anywhere in the receiver 100 or elsewhere in the device, and is configured to store data samples of the baseband I/O output signal data samples for at least one baseband signal cycle. The memory may comprise a plurality of memories. The memory may be further configured to store the baseband I/O output signal data samples asynchronously or nonconsecutively, with I/O data sample doublets remaining linked.

At the test signal switch 130, through which the transmitted and reflected signals pass, the test signal is injected. In previous approaches, the quality of the test signal, specifically the frequency and amplitude accuracy, influences the I/O imbalance compensation quality. However, the solution of this disclosure is much less susceptible to an impairment of the test signal. The generation of the test signal is described below with respect to FIG. 2.

The LO signal source 160 is configured to provide a local oscillator signal at a difference frequency with respect to the measured test signal frequency. The difference frequency (between LO and test signal fundamental frequency) shall fall within a passband of the receiver's LPF filter 180.

This disclosure is applicable to receiver implementations in polar transmitter configurations, and also to feedback receivers used in transmitters based on quadrature. The disclosure is also applicable to measure I/O impairments in any receiver configuration.

Figure 2:
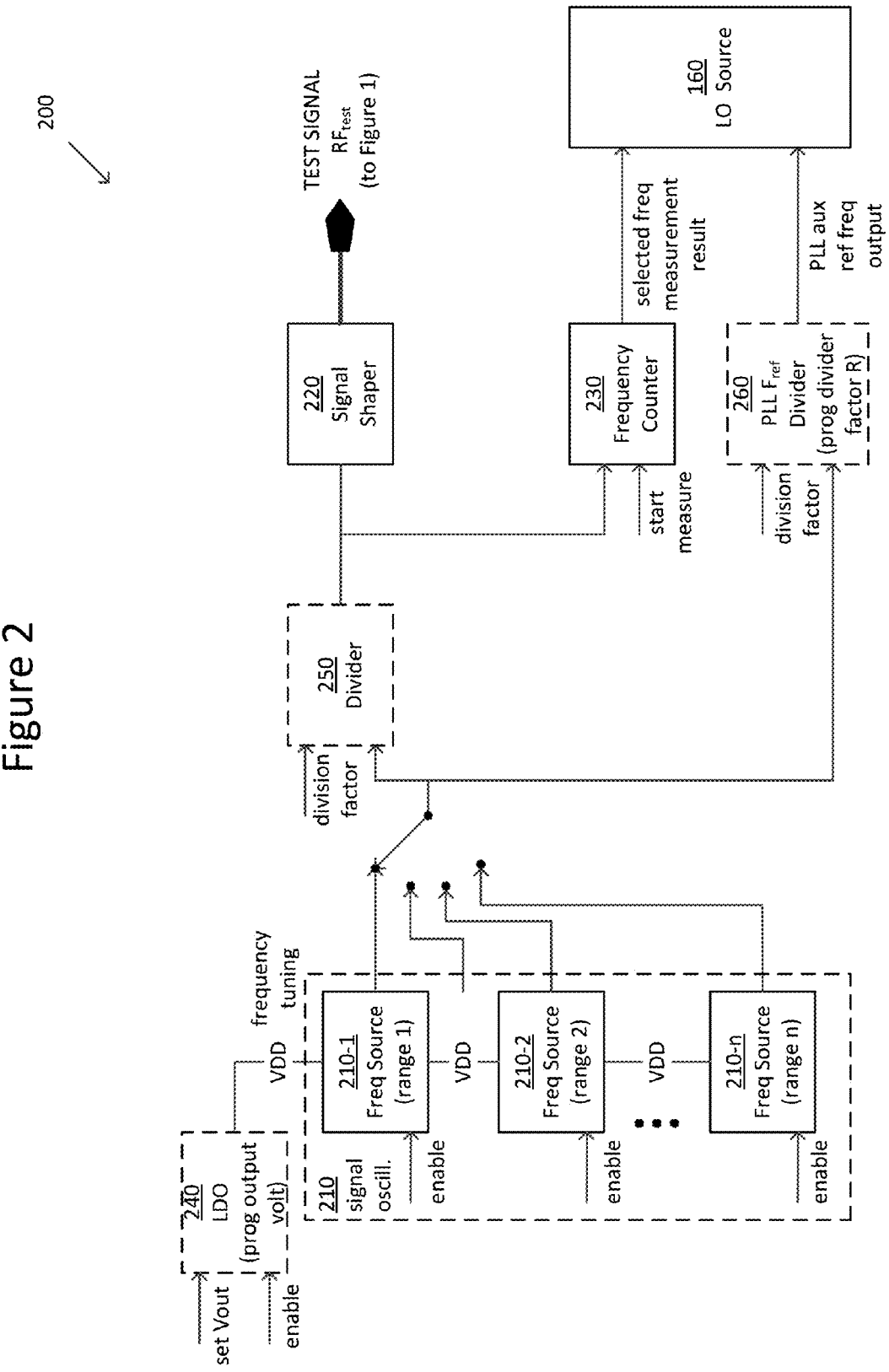
FIG. 2 illustrates a schematic diagram of a test signal generator of the vector demodulator (=I/Q demodulator) based receiver of FIG. 1.

FIG. 2 illustrates a schematic diagram of a test signal generator of the vector demodulator (i.e., I/O demodulator) based receiver 100 of FIG. 1. The output post at the right side of FIG. 2 is coupled to the input post on the left side of FIG. 1.

The test signal generator 200 is configured to generate a test signal, and to measure a frequency of the test signal. The test signal does not need to be frequency locked. Also, the test signal generator is located is on-board the same chip as the receiver 100.

Compared with requirements of previous solutions, the test signal of the present disclosure has a couple of requirements. First, ideally the test signal is sinusoidal, that is, the test signal should have low/no harmonic tones in order to avoid harmonic down conversion in the quadrature demodulator 150 by the typically rectangular waveform LOI/LOQ signals, which would create an error in the LO impairment determination.

The test signal generator 200 comprises a frequency source 210, a signal shaper 220, a frequency counter 230, an optional voltage regulator 240, an optional divider 250, and an optional Phase Locked Loop (PLL) frequency divider 260.

The frequency source 210 is configured to generate the test signal. The frequency source 210 may comprise a plurality of frequency sources 210-1 to 210-n having respective frequency ranges. The frequency source(s) 210 may be, for example, ring oscillator(s).

An aspect of the disclosure is to have the test signal source not from a precise frequency-controlled synthesized signal source, which would be costly and area consuming, but an inexpensive frequency source 210. An example of an inexpensive signal source is a RING Oscillator (RINGO), which is relatively small, inexpensive, and can be tuned to operate at any frequency up to several GHz. RINGOs are susceptible to temperature variations, supply variations, etc., but in this case, such a feature is acceptable. The frequency source 210 does not need to be frequency locked, and there is no control loop. It is important, however, that the frequency source is close to the LO frequency. By "close" it is meant that a difference in frequency between the frequency source and the LO frequency is within the bandpass of the LPF 180 of FIG. 1. If the frequency difference is too large, then the difference frequency would not pass through the LPF 180.

The optional voltage regulator 240 is configured to tune a supply voltage of the frequency source 210. The voltage regulator 240 may be, for example, a Low-DropOut (LDO) regulator. When the voltage regulator 240 is not needed, the "set Vout" and "Enable" inputs are set to a quiet state so as to not waste power. "Set Vout" is used to tune the frequency of the frequency source 210 via its applied supply voltage, using the typically non-zero supply pushing sensitivity of oscillators. But again, the frequency sources 210 are not required to be frequency locked; the frequency tuning is merely a feature to increase flexibility.

The frequency counter 230 is configured to measure the frequency of the test signal. The output of the frequency counter 230 is a number which is used to tune the frequency of the LO source 160, which generates the LO signal. The test signal is the actual frequency source frequency signal, and the frequency counter outputs a number in, for example, Hertz, which is based on the frequency source frequency. The frequency counter 230 does not make the frequency source frequency more precise, but instead provides a precise measurement.

In this disclosure, the frequency sources 210 are assumed to oscillate at a frequency close to the LO frequency, and then the frequency source frequency is measured because the frequency measurement can be performed precisely. The PLL or LO source can be tuned to a precise difference frequency with respect to the frequency source frequency. In summary, the free-running frequency source 210 oscillates, the frequency source's frequency is measured, and the difference frequency is used for the LO signal generation (LO frequency=frequency source frequency+difference frequency). It is the difference frequency that is most significant. The I/O imbalance may then be determined, as described further below.

Rather than a single frequency source 210, it is possible to deploy several frequency sources with different frequencies tuned to, for example, 2.5 GHz, 2 GHz, 1 GHz, etc., whatever is required for a particular application but to select one best suited frequency source at the time for the calibration of I/O imbalance.

The optional frequency divider 250 is configured to divide the frequency of the test signal by a division factor. For example, if a test signal in both the 2 GHz domain and also in the 1 GHz domain are needed, then rather than use two frequency sources 210, it is possible to use one frequency source 210 and the frequency divider 250.

As an alternative approach to measuring the frequency source frequency, the selected frequency source 210 could be run through an optional divider 260 with division factor R to generate a reference frequency $f_{REF}$ for the synthesizer used to generate the LO signal. This synthesizer would then only have to be programmed to a fixed frequency of $f_{LO}=D\times f_{REF}+f_{FBR\_PB}$ and to create I/O down conversion products which fall into the receiver's passband. A frequency measurement can be avoided, but to support multiple frequency sources 210 and a wide frequency range, a programmable divider factor D and the LO PLL should have the ability to cope with reference frequencies that are different to usual frequencies.

Thus, rather than the frequency lock referring to a precise reference frequency from a frequency synthesizer, alternatively the frequency source output is divided down to be in a same frequency range as the crystal frequency, and used to generate the LO signal instead of the frequency synthesizer. In such a case the frequency source frequency can still wander due to, for example, a temperature effect, because the divided signal for the PLL, the reference signal, would wander in the same manner. Also, the difference frequency therebetween would remain constant. The output from the divider 260 is used instead of the crystal to feed to the PLL which generates the LO signal.

The signal shaper 220 is configured to amplify and/or attenuate the test signal and apply the test signal to the test signal switch 130 of FIG. 1. The signal shaper 220 is also configured to attenuate harmonic components of the test signal, and to let only the fundamental frequency pass through.

The following is an overview of four steps of the baseband output data (BBI/BBQ) acquisition:

1. For a LO source 160, which covers a desired frequency band, a frequency source 210 plus optional divider factor of a divider 250 is selected to create a test signal RFtest in the respective frequency band.

2. The frequency of the test signal RFtest is measured by the frequency counter 230.

3. The synthesizer, which generates the current LO signal, is tuned to generate an LO frequency of $f_{RFtest}+(/-) f_{FBR\_PB}$, where $f_{RFtest}$ is the frequency of the test signal, and $f_{FBR\_PB}$ is the frequency of the difference signal.

4. The frequency of the test signal RFtest is applied to the input of the receiver 100 and the I/O baseband output data (BBI/BBQ) acquisition is started. If run long enough (dependent of the selected difference frequency), enough data samples (BBI+BBQ doublets) are recorded to cover at least one complete baseband signal cycle. If the recording memory is not large enough to store one cycle, several consecutive recordings can be started and the data can be transferred to a larger memory where the data can be collected. The data acquisition need not be synchronous, and a single recording attempt need not store exactly consecutive data segments or in a certain order. There just need be time for enough data to be obtained to cover at least one baseband signal cycle. However, recording more cycles allows for averaging and can reduce noise. While the data order is not important, the obtained BBI/BBQ data doublets should be kept together and must remain linked.

The data acquisition method could be performed for a while. When another task is required to be performed, the data acquisition could be stopped temporarily. Data samples may be acquired at startup. The more data samples collected, the more precise the result. Data acquisition can be stopped once the I/O imbalance is known, and then the receiver 100 can be used for its intended operation, and the I/O imbalance can be corrected. All required hardware is on-board, so there is no need for an external test signal source. The data acquisition can be re-run every time the wireless device is turned on, for example. Drifts can be tracked over the wireless device's lifetime.

The algorithm to determine the I/O gain and phase imbalance in the receiver 100 is based on the acquired data as described above. Using the data doublets acquired with the above method, a simple and computationally inexpensive algorithm determines BBI/BBQ signal gain and phase imbalance. This algorithm is as described in the following nine steps.

1. From all BBI/BBQ doublets (order not of interest) the average value is calculated separately for BBI and BBQ. This calculation results directly in the DC offset BBI_average and BBQ_average, and is stored to be applied to data samples obtained during a regular receiver 100 operation.

$$BBI\_average=mean(BBI(1:end));  \quad\text{(Equation 1)}$$

$$BBQ\_average=mean(BBQ(1:end));  \quad\text{(Equation 2)}$$

2. All BBI/BBQ doublets are DC adjusted by subtracting BBI_average and BBQ_average. The data is then DC free.

$$BBI(1:end)=BBI(1:end)-BBI\_average;  \quad\text{(Equation 3)}$$

$$BBQ(1:end)=BBQ(1:end)-BBQ\_average;  \quad\text{(Equation 4)}$$

3. From all DC-corrected BBI/BBQ doublets two root mean square (rms) values are calculated separately for BBI and BBQ:

$$BBI\_rms=rms(BBI(1:end));  \quad\text{(Equation 5)}$$

$$BBQ\_rms=rms(BBQ(1:end));  \quad\text{(Equation 6)}$$

4. From BBI_rms and BBQ_rms a gain imbalance factor is calculated and stored to be applied in later regular FBR operation:

$$GainImbal=BBI\_rms/BBQ\_rms;  \quad\text{(Equation 7)}$$

5. All BBI/BBQ doublets are amplitude normalized by applying BBI_rm and BBQ_rms. In real implementations BBI/BBQ can be scaled here to serve for a higher fidelity in the following computation steps but here we stay on mathematical level:

$$BBI(1:end)=BBI(1:end)/BBI\_rms;  \quad\text{(Equation 8)}$$

$$BBQ(1:end)=BBQ(1:end)/BBQ\_rms;  \quad\text{(Equation 9)}$$

6. Now all BBI/BBQ doublets, which represent Cartesian coordinates, are recomputed into polar coordinate doublets:

$$BBrad(1:end)=sqrt(BBI(1:end)^2+BBQ(1:end)^2);  \quad\text{(Equation 10)}$$

$$BBphi(1:end)=arctan(BBQ(1:end)/BBI(1:end));  \quad\text{(Equation 11)}$$

7. Now, from the complete set of available polar coordinate doublets only those are selected for which BBphi(n)=45° (or the respective value pi/4 in radiants).

From all these selected 45° samples the average radius is calculated:

BBrad_45=mean(BBrad(*n*)) for all *n* where BBphi
(*n*)=45°); (Equation 12)

8. Similarly, from the complete set of available polar coordinate doublets only those are selected for which BBphi (n)=135° (or the respective value pi*3/4 in radiants).

From all these selected 135° samples the average radius is calculated:

BBrad_135=mean(BBrad(*n*)) for all *n* where BBphi
(*n*)=135°); (Equation 13)

9. The difference of BBrad_45 and BBrad_135 is a direct measure of I/O phase imbalance. It has only to be scaled appropriately to give the result in either grad or radians.

PhaseImbal=ScalingFactor*(BBrad_45−BBrad_135); (Equation 14)

After complete execution of the algorithm, the obtained values for BBI/BBQ DC-offset, gain and phase imbalance can be applied to the received BBI/BBQ data in regular operation to correct the impairments. Different hardware and/or software implementations exist for this task which can directly use the obtained correction factors.

Figure 3A:
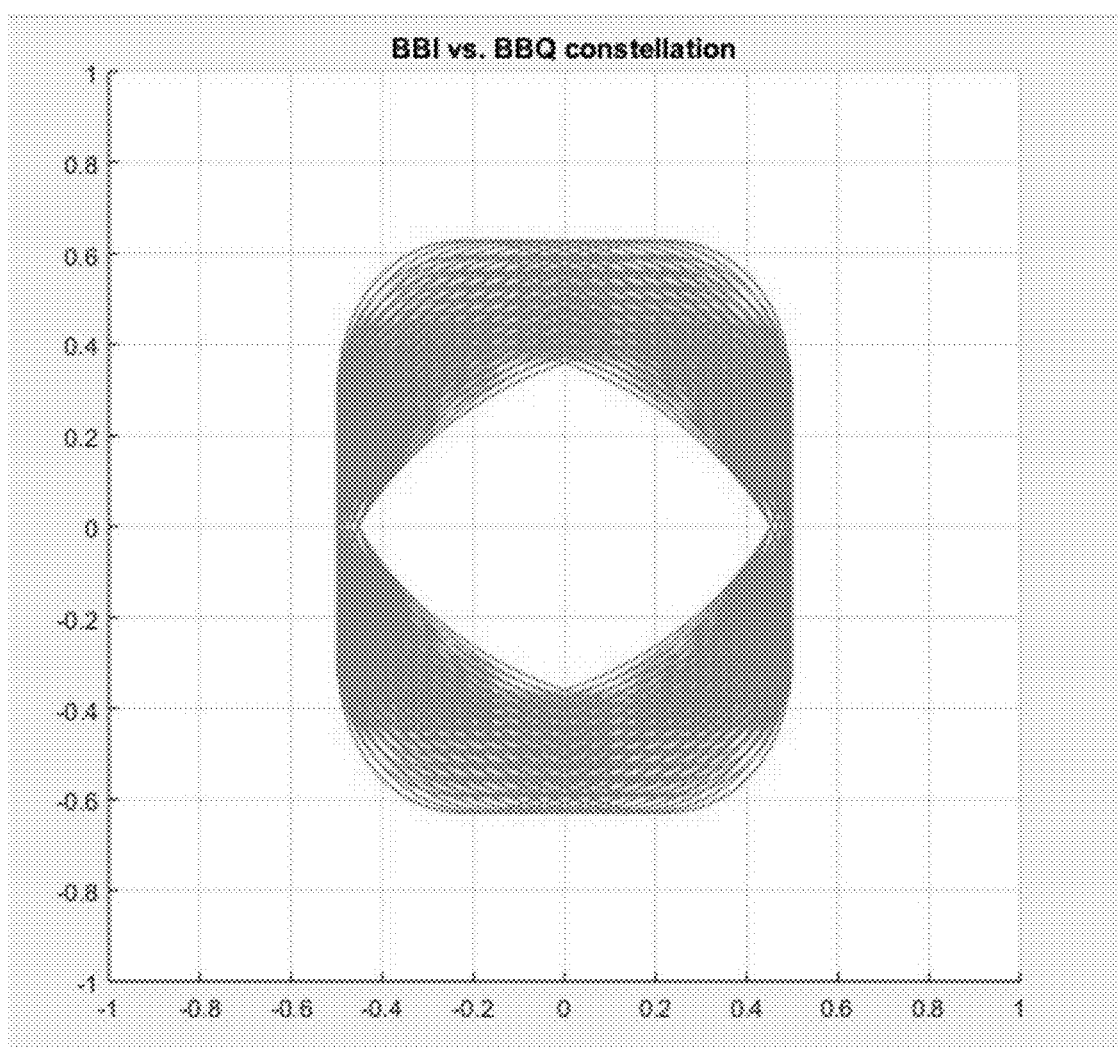
FIG. 3A illustrates an example I/Q constellation diagram with imposed amplitude and phase imbalance due to typical impairments prior to amplitude normalization.
Figure 3B:
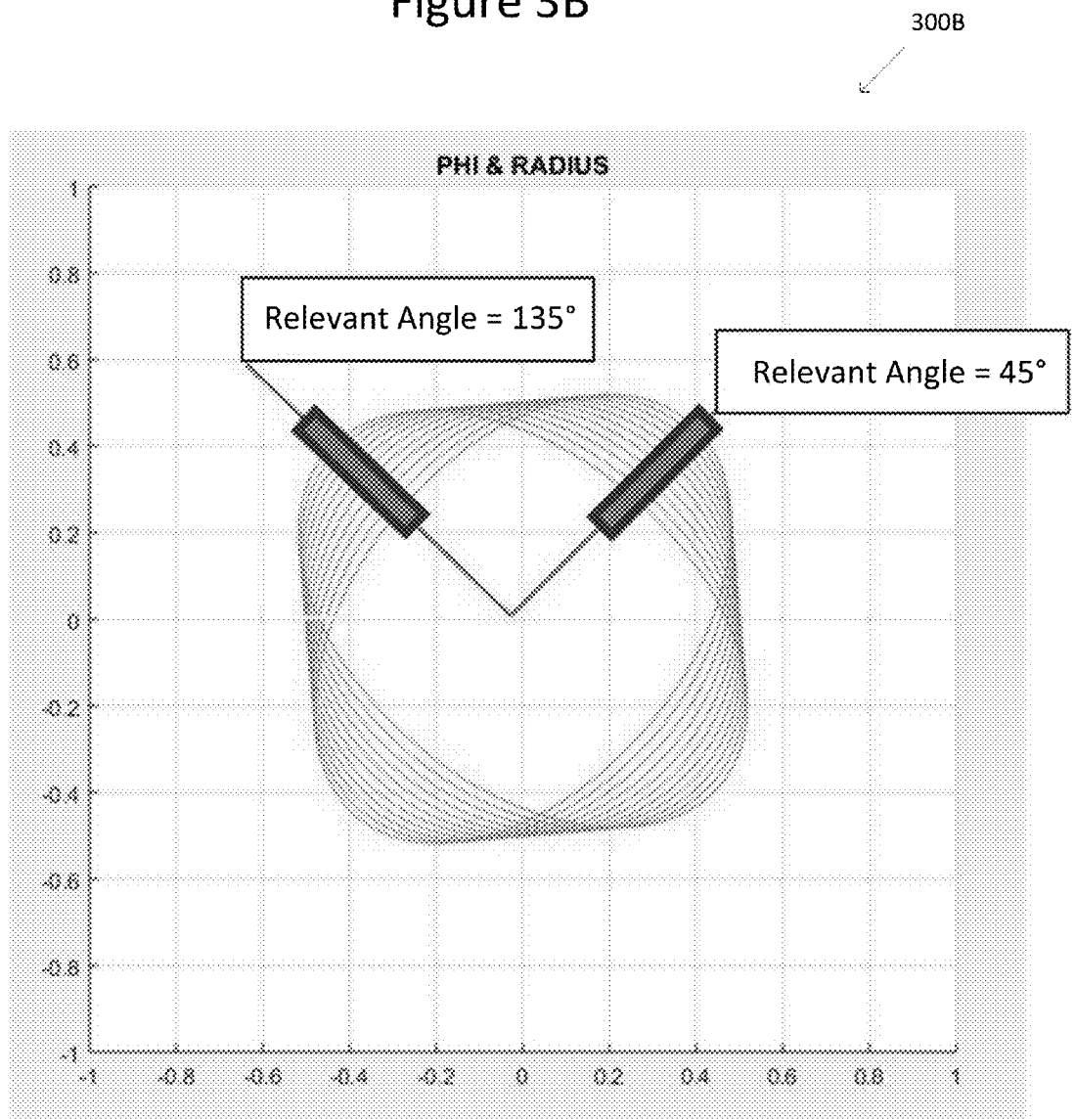
FIG. 3B illustrates an example I/Q constellation diagram subsequent to amplitude normalization, plus indication of the relevant angles where the trajectory shall be evaluated.
Figure 3C:
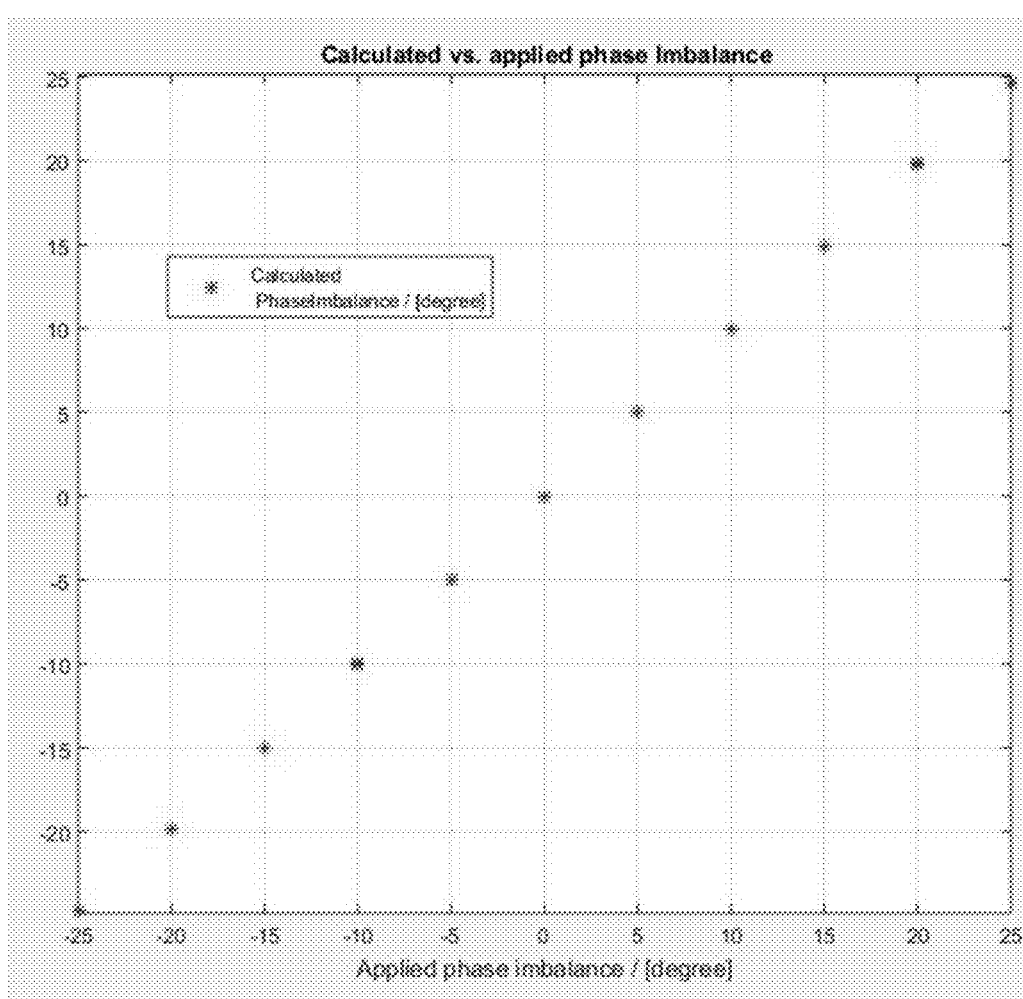
FIG. 3C illustrates a diagram of a scaled result for the I/Q phase imbalance.

FIGS. 3A-3C illustrate diagrams throughout various points in the nine-step algorithm described above to determine the I/O gain and phase imbalance in the receiver 100.

FIG. 3A illustrates an example I/O constellation diagram 300A with imposed amplitude and phase imbalance prior to amplitude normalization, that is prior to step 5 in the nine-step algorithm described above. This diagram 300A shows ellipses for all gain and phase imbalance values and for the various difference frequencies. There are 11×9×4 shapes.

FIG. 3B illustrates an example I/O constellation diagram 200B subsequent to amplitude normalization, plus an indication of the relevant angles where a trajectory shall be evaluated, that is, subsequent to step 6 in the nine-step algorithm described above. There are only eleven remaining shapes after amplitude normalization, remapping to polar coordinates and ordering of the data doublets with increasing angle. The eleven shapes represent the eleven given values for phase imbalance.

FIG. 3C illustrates a diagram 300C showing a scaled result for the I/O phase imbalance, that is, after step 9 in the nine-step algorithm described above. The diagram is linear across the complete tested range.

Figure 4:
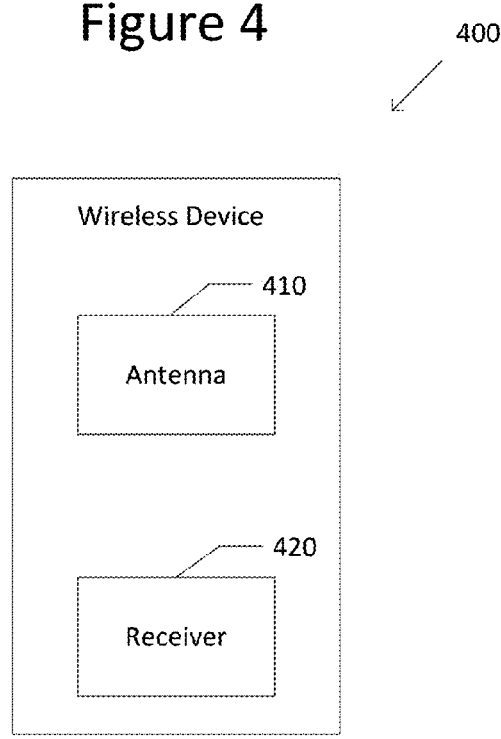
FIG. 4 illustrates a wireless device in accordance with an aspect of the disclosure.

FIG. 4 illustrates a wireless device 400 in accordance with an aspect of the disclosure. The wireless device 400 comprises an antenna 410 and a receiver 420. The receiver is the receiver 100 as described above with respect to FIG. 1.

Figure 5:
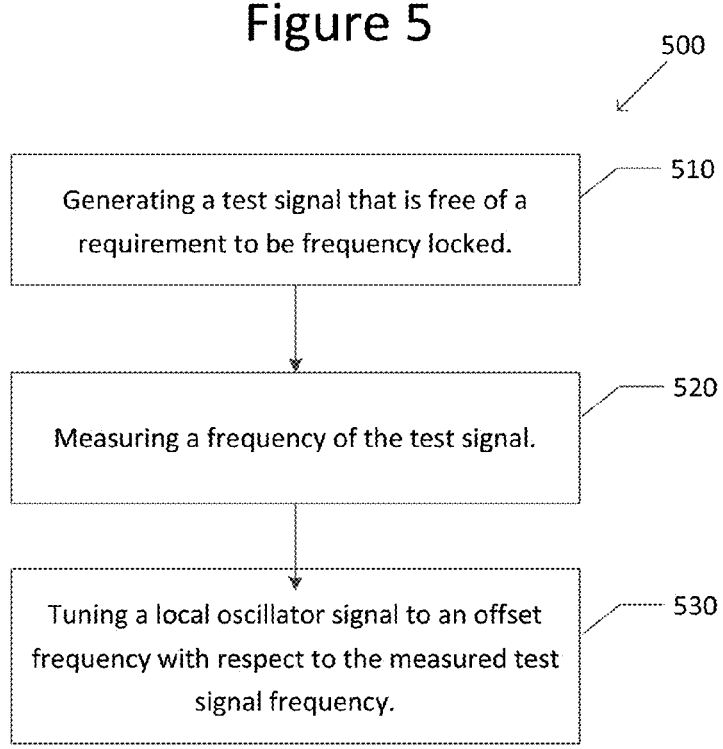
FIG. 5 illustrates a flowchart of a method for tuning a local oscillator signal in the receiver of FIG. 1.

FIG. 5 illustrates a flowchart 500 of a Built-In Self-Test (BIST) method for tuning a local oscillator signal of the receiver of FIG. 1.

At Step 510, a test signal generator 200 generates a test signal that is free of a requirement to be frequency locked.

At Step 520, the test signal generator 200 measures a frequency of the test signal.

At Step 530, the local oscillator signal source 160 tunes a local oscillator signal to an difference frequency with respect to the measured test signal frequency. The difference frequency falls within a passband.

Since the he test signal generator is located is on-board the same chip as the receiver 100, the method may be performed as a Built-In Self-Test (BIST).

This disclosure is applicable to any kind of I/Q-based receiver with a vector-modulator signal. The approach disclosed herein is suitable also for polar transmitter architectures. There is a hardware add-on to existing receivers plus a method to determine the LOI/LOQ (including general gain imbalances in the overall FBR signal processing chain) impairments from the BBI/BBQ down conversion mixer results.

The hardware add-on is inexpensive and the added circuit elements are mainly digital elements, and can easily be added to a modern transmitter system, which are typically built in a high performance digital process.

While throughout the calibration procedure the amplitude of the test signal necessarily has to be held constant (and at an appropriate level to avoid both clipping and significant noise deterioration), the method does not require a fixed and exactly known difference between test signal frequency and LO frequency. Even drifting and wandering frequency differences and therefore (assuming a stable LO) test signal frequency deviations do not harm as long as the difference frequency stays within the passband of the receiver filter.

Different frequency differences of the test signal with respect to the receiver LO only lead to a slower or faster rotation around the constellation diagram. As long as the calibration procedure is exercised long enough to cover once all points in the constellation trajectory, the calibration can be handled by the proposed algorithm to determine the constellation impairments. Also phase and amplitude noise of the test signal is a minor concern if enough time for averaging is available.

The following examples described further embodiment.

Example 1 is a receiver, comprising: a test signal generator configured to generate a test signal that is free of a requirement to be frequency locked, and to measure a frequency of the test signal; and a local oscillator signal source configured to tune a local oscillator signal to a difference frequency with respect to the measured test signal frequency, wherein the difference frequency falls within a passband of a passband filter of the receiver.

In Example 2, the subject matter of Example 1, wherein the test signal generator comprises a frequency source configured to generate the test signal, and is on-board.

In Example 3, the subject matter of Example 2, wherein the frequency source comprises a plurality of frequency sources having respective frequency ranges.

In Example 4, the subject matter of Example 2, wherein the test signal generator further comprises: a voltage regulator configured to tune a supply voltage of the frequency source.

In Example 5, the subject matter of Example 2, wherein the frequency source comprises one or more ring oscillators.

In Example 6, the subject matter of Example 1, wherein the test signal generator comprises: a frequency counter configured to measure the frequency of the test signal.

In Example 7, the subject matter of Example 1, further comprising: a quadrature demodulator configured to demodulate the test signal with the local oscillator signal and output a baseband In-phase Quadrature (I/Q) output signal.

In Example 8, the subject matter of Example 7, further comprising: a memory configured to store data samples of the baseband I/O output signal for at least one baseband signal cycle.

In Example 9, the subject matter of Example 8, wherein the memory comprises a plurality of memories.

In Example 10, the subject matter of Example 8, wherein the memory is further configured to store the baseband I/Q output signal data samples asynchronously or nonconsecutively, with I/Q data sample doublets remaining linked.

In Example 11, the subject matter of Example 1, wherein the test signal generator comprises: a frequency divider configured to divide the frequency of the test signal by a division factor.

In Example 12, the subject matter of Example 11, further comprising: a Phase Locked Loop (PLL) configured to generate the local oscillator signal based on an output of the frequency divider.

Example 13 is a Built-In Self-Test (BIST) method for tuning a local oscillator signal in a receiver, the method comprising: generating, by a test signal generator, a test signal that is free of a requirement to be frequency locked; measuring, by the test signal generator, a frequency of the test signal; and tuning, by a local oscillator signal source, a local oscillator signal to a difference frequency with respect to the measured test signal frequency, wherein the difference frequency falls within a passband of a passband filter of the receiver.

In Example 14, the subject matter of Example 13, wherein the generating the test signal comprises generating the test signal by a frequency source.

In Example 15, the subject matter of Example 14, wherein the generating the test signal comprises generating the test signal by a plurality of frequency sources having respective frequency ranges.

In Example 16, the subject matter of Example 14, further comprising: tuning, by a voltage regulator, a supply voltage of the frequency source.

In Example 217, the subject matter of Example 14, wherein the generating the test signal comprises generating the test signal by one or more ring oscillators.

In Example 18, the subject matter of Example 13, further comprising: demodulating, by a quadrature demodulator, the test signal with the local oscillator signal, and outputting a baseband In-phase Quadrature (I/Q) output signal; and storing, in a memory, samples of the baseband I/Q output signal for at least one baseband signal cycle.

In Example 19, the subject matter of Example 18, wherein the tuning comprises: converting the baseband I/Q output signal data samples into polar coordinates; and subtracting an average radius of data sample polar coordinates of a second angle from an average radius of data sample polar coordinates of a first angle, wherein the second angle differs from the first angle by 90 degrees, and the subtraction result is an I/Q phase imbalance of the I/Q receiver.

In Example 20, the subject matter of Example 18, wherein the storing comprises storing the baseband I/Q output signal data samples in a plurality of memories.

In Example 21, the subject matter of Example 18, wherein the storing comprises storing the baseband I/Q output signal data samples asynchronously or nonconsecutively, with I/Q data sample doublets remaining linked.

In Example 22, the subject matter of Example 13, further comprising: dividing, by a frequency divider, the frequency of the test signal by a division factor.

In Example 23, the subject matter of Example 22, further comprising: generating, by a Phase Locked Loop (PLL), the local oscillator signal based on an output of the frequency divider.

In Example 24, the subject matter of Example 13, wherein the method is performed in the field.

In Example 25, the subject matter of Example 13, further comprising: determining I/O imbalances based on the difference frequency.

Example 26 is a receiver, comprising: a test signal generating means for generating a test signal that is free of a requirement to be frequency locked, and for measuring a frequency of the test signal; and a local oscillator signal source means for tuning a local oscillator signal to a difference frequency with respect to the measured test signal frequency, wherein the difference frequency falls within a passband of a passband filter of the receiver.

In Example 27, the subject matter of Example 26, wherein the test signal generating means comprises: a frequency source means for generating the test signal, and is on-board.

In Example 28, the subject matter of Example 27, wherein the frequency source means comprises a plurality of frequency source means having respective frequency ranges.

In Example 29, the subject matter of Example 27, wherein the test signal generating means further comprises: a voltage regulating means for tuning a supply voltage of the frequency source.

In Example 30, the subject matter of Example 27, wherein the frequency source means comprises one or more ring oscillators.

In Example 31, the subject matter of any of Examples 26-30, wherein the test signal generating means comprises: a frequency counting means for measuring the frequency of the test signal.

In Example 32, the subject matter of any of Examples 26-30, further comprising: a quadrature demodulating means for demodulating the test signal with the local oscillator signal and output a baseband In-phase Quadrature (I/Q) output signal.

In Example 33, the subject matter of Example 32, further comprising: a memory means for storing data samples of the baseband I/O output signal for at least one baseband signal cycle.

In Example 34, the subject matter of Example 33, wherein the memory means comprises a plurality of memory means.

In Example 35, the subject matter of Example 33, wherein the memory means is further for storing the baseband I/Q output signal data samples asynchronously or nonconsecutively, with I/Q data sample doublets remaining linked.

In Example 36, the subject matter of any of Examples 26-30, wherein the test signal generating means comprises: a frequency dividing means for dividing the frequency of the test signal by a division factor.

In Example 37, the subject matter of Example 36, further comprising: a Phase Locked Loop (PLL) means for generating the local oscillator signal based on an output of the frequency divider.

Example 38 is an apparatus substantially as shown and described.

Example 39 is a method substantially as shown and described.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A receiver, comprising:
a test signal generator configured to generate a test signal that is free of a requirement to be frequency locked, and to measure a frequency of the test signal; and a local oscillator signal source configured to tune a local oscillator signal to a difference frequency with respect to the measured test signal frequency, wherein the difference frequency falls within a passband of a passband filter of the receiver.

2. The receiver of claim 1, wherein the test signal generator comprises a frequency source configured to generate the test signal, and is on-board.

3. The receiver of claim 2, wherein the frequency source comprises a plurality of frequency sources having respective frequency ranges.

4. The receiver of claim 2, wherein the test signal generator further comprises:
a voltage regulator configured to tune a supply voltage of the frequency source.

5. The receiver of claim 2, wherein the frequency source comprises one or more ring oscillators.

6. The receiver of claim 1, wherein the test signal generator comprises:
a frequency counter configured to measure the frequency of the test signal.

7. The receiver of claim 1, further comprising:
a quadrature demodulator configured to demodulate the test signal with the local oscillator signal and output a baseband In-phase Quadrature (I/Q) output signal.

8. The receiver of claim 7, further comprising:
a memory configured to store data samples of the baseband I/Q output signal for at least one baseband signal cycle.

9. The receiver of claim 8, wherein the memory comprises a plurality of memories.

10. The receiver of claim 8, wherein the memory is further configured to store the baseband I/Q output signal data samples asynchronously or nonconsecutively, with I/Q data sample doublets remaining linked.

11. The receiver of claim 1, wherein the test signal generator comprises:
a frequency divider configured to divide the frequency of the test signal by a division factor.

12. The receiver of claim 11, further comprising:
a Phase Locked Loop (PLL) configured to generate the local oscillator signal based on an output of the frequency divider.

13. A Built-In Self-Test (BIST) method for tuning a local oscillator signal in a receiver, the method comprising:
generating, by a test signal generator, a test signal that is free of a requirement to be frequency locked;
measuring, by the test signal generator, a frequency of the test signal; and
tuning, by a local oscillator signal source, a local oscillator signal to a difference frequency with respect to the measured test signal frequency,
wherein the difference frequency falls within a passband of a passband filter of the receiver.

14. The BIST method of claim 13, wherein the generating the test signal comprises generating the test signal by a frequency source.

15. The BIST method of claim 14, wherein the generating the test signal comprises generating the test signal by a plurality of frequency sources having respective frequency ranges.

16. The BIST method of claim 14, further comprising:
tuning, by a voltage regulator, a supply voltage of the frequency source.

17. The BIST method of claim 14, wherein the generating the test signal comprises generating the test signal by one or more ring oscillators.

18. The BIST method of claim 13, further comprising:
demodulating, by a quadrature demodulator, the test signal with the local oscillator signal, and outputting a baseband In-phase Quadrature (I/Q) output signal; and
storing, in a memory, samples of the baseband I/Q output signal for at least one baseband signal cycle.

19. The BIST method of claim 18, wherein the tuning comprises:
converting the baseband I/Q output signal data samples into polar coordinates; and
subtracting an average radius of data sample polar coordinates of a second angle from an average radius of data sample polar coordinates of a first angle, wherein the second angle differs from the first angle by 90 degrees, and the subtraction result is an I/Q phase imbalance of the I/Q receiver.

20. The BIST method of claim 18, wherein the storing comprises storing the baseband I/Q output signal data samples in a plurality of memories.

21. The BIST method of claim 18, wherein the storing comprises storing the baseband I/Q output signal data samples asynchronously or nonconsecutively, with I/Q data sample doublets remaining linked.

22. The BIST method of claim 13, further comprising:
dividing, by a frequency divider, the frequency of the test signal by a division factor.

23. The BIST method of claim 22, further comprising:
generating, by a Phase Locked Loop (PLL), the local oscillator signal based on an output of the frequency divider.

24. The BIST method of claim 13, wherein the method is performed in the field.

25. The BIST method of claim 13, further comprising:
determining I/Q imbalances based on the difference frequency.

* * * * *